INVENTOR.
Stewart L. Clothier
BY S. Stephen Baker
ATTORNEY

May 11, 1954 S. L. CLOTHIER 2,678,347

TELEVISION CONTROL SYSTEM

Filed May 19, 1949 7 Sheets-Sheet 2

INVENTOR.
Stewart L. Clothier
BY
S. Stephen Baker
ATTORNEY

TELEVISION CONTROL SYSTEM

Filed May 19, 1949 7 Sheets-Sheet 3

INVENTOR.
Stewart L. Clothier
BY S. Stephen Baker
ATTORNEY.

May 11, 1954 S. L. CLOTHIER 2,678,347

TELEVISION CONTROL SYSTEM

Filed May 19, 1949 7 Sheets-Sheet 4

INVENTOR.
Stewart L. Clothier
BY
D. Stephen Baker
ATTORNEY

May 11, 1954 S. L. CLOTHIER 2,678,347

TELEVISION CONTROL SYSTEM

Filed May 19, 1949 7 Sheets-Sheet 5

INVENTOR.

Stewart L. Clothier

BY

S. Stephen Baker

ATTORNEY

INVENTOR.
Stewart L. Clothier
BY S. Stephen Baker
ATTORNEY

INVENTOR.
Stewart L. Clothier
BY
S. Stephen Baker
ATTORNEY

Patented May 11, 1954

2,678,347

UNITED STATES PATENT OFFICE 2,678,347

TELEVISION CONTROL SYSTEM

Stewart L. Clothier, New York, N. Y.

Application May 19, 1949, Serial No. 94,183

24 Claims. (Cl. 178—5.1)

This invention relates to television transmitting and receiving systems and more particularly to methods, apparatus and circuits for effectively confining television programs to pre-selected recipients. Thus, the system may be considered to be a television reception control system whereby intelligible pictures or the like will be available to authorized receivers whereas distortion will occur in conventional receivers.

Television systems include the scanning of scenes at the transmitter end to produce a video signal and the transmission thereof on a carrier together with synchronizing signals which correspond in time to the scanning process. When such spnchronizing signals are received and separated in a television receiver, they automatically provide the intelligence necessary for synchronously reproducing the successive fields of the scanning pattern.

Viewing the improved system broadly, it provides for a discrepancy between the transmitter scanning process and the radiated synchronizing signals which are made available to the receiver. Accordingly, in the absence of correction, the scanning pattern cannot be reproduced accurately and the pictures become so distorted as to be substantially unintelligible. More specifically, predetermined scanning errors are introduced in the television camera. The synchronizing signals are conventional, however, so that as the normal receiver separates such synchronizing signals from the carrier and its scanning system responds thereto, it cannot faithfully reproduce the transmitted scenes because such conventional synchronizing signals were not used per se in the scanning process of the transmitter.

Authorized receivers, however, are provided with apparatus for deriving correcting signals from the received synchronizing signals so as to reproduce the errors which were generated at the transmitter and emploped for scanning.

A particular feature of the instant system is that the error signal generated at the transmitter employs essentially the same source of signals as does the receiver in reproducing such errors. Accordingdy, not only is the system considerably simplified, but certainty of receiver action in reproducing the required synchronizing errors is made more positive.

Inasmuch as normal synchronizing signals are transmitted with a normal carrier, any receiver may tune in to the transmission and its scanning oscillators will lock in with such synchronizing signals. Any receiver will more or less reproduce the transmitted scenes. A receiver not equipped to synchronize its action with the scanning action of the transmitter will receive only distortion. A properly equipped receiver will receive a faithful reproduction of the transmitted scenes.

In realizing the preferred form of the instant system, normal vertical synchronizing signals are applied to the television camera from the conventional horizontal and vertical synchronizing and blanking generator found in conventional television transmitting apparatus. The horizontal synchronizing signal is not applied directly to the television camera but is utilized in producing phase-modulated horizontal synchronizing signals which are so applied to introduce the predetermined error as above mentioned. Horizontal synchronizing pulses, in present-day systems, have a frequency of 15,750 cycles per second. In the process of providing phase modulated horizontal synchronizing pulses to the camera, such frequency is essentially maintained so that a normal picture is made possible at the receiver tube. The error signal which is used to phase modulate the camera horizontal, synchronizing signals is derived from the normal vertical synchronizing signals. The phase modulated signals are arranged to be in the form of pulses which essentially reproduce the wave shapes of the normal horizontal synchronizing pulses, although displaced in phase therefrom to predetermined degrees. These phase displaced signals are then fed to the television camera. As a result, the camera scanning is normal for vertical scan but the horizontal scan will be phase modulated in each field with respect to normal horizontal synchronizing. The video output has corresponding phase errors and may therefore be called a phase modulated video signal. This signal is put on the video channel so as to form together with the synchronizing and blanking pulses a composite video, synchronizing and blanking modulated carrier which is transmitted in the conventional manner. This carrier is normal with but one exception, i. e. the video portion of the transmission is deliberately phase modulated while the synchronizing and blanking signals are not.

Any normal television receiver will provide a picture representation by locking in with both the transmitted vertical and horizontal synchronizing signals including normal vertical and horizontal return trace blanking. However, this picture will be so distorted as to be of no entertainment or other conventional value.

As a suggested method of producing a phase modulated horizontal synchronizing signal, such modulation may be effected by employing a modulating signal frequency which is not an exact multiple of the vertical synchronizing signal. As a result, not only does distortion ocur as above mentioned, but the distortion also drifts so as to further interfere with unauthorized reception. For example, the vertical synchronizing signal being 60 cycles, the error signal may be an irregular frequency such as 181.5 cycles or any departure from an exact multiple of the 60 cycle frequency. This will cause the receiver errors in a normal receiver to drift vertically while the normal horizontal synchronizing will produce lateral distortion. If the error signal is an exact multiple, substantially only the lateral distortion will be evident.

An authorized receiver, when tuned to the carrier, is equipped so as to produce in its own scanning, the scanning errors of the transmitter. Thus, a portion of the received vertical synchronizing signal is used to control a correction signal generator. It will be understood that this vertical synchronizing signal used by the authorized receiver is the same signal from which the transmitter scanning error signal was derived. Accordingly, the receiver can be made to accurately follow the transmitter deviation from normal scanning so as to produce a clear, undistorted picture.

The correction signal generator of the receiver is designed to provide a signal of pre-selected wave form corresponding to the transmitter error signal as to wave form, frequency and phase. Circuits for accomplishing this purpose are hereinafter set forth. Whereas the horizontal scanning oscillator is conventionally used to control the output horizontal scanning circuit directly, it is, in the instant system, first phase modulated by the output of the correction signal generator and then used to control the output horizontal scanning circuit.

The modified or authorized receiver is thus able to phase modulate its own horizontal scanning. Other functions in the receiver are essentially normal. Means are further provided to manually control the degree of phase modulation of the horizontal scanning signals as by controlling the amplitude of the correction signal. Means are also provided to control the phase of the correction signal with relation to the vertical synchronizing signal.

The receiver thus compensates for predetermined, deliberate transmission errors by introducing picture correction phase modulation into its own horizontal scanning apparatus. The degree and phase of the correction signals may be precisely controlled so as to duplicate the scanning action at the transmitter and thus place the elemental areas of the received pictures precisely where they belong.

The invention will be further understood from the following description and drawings in which.

Figure 1:
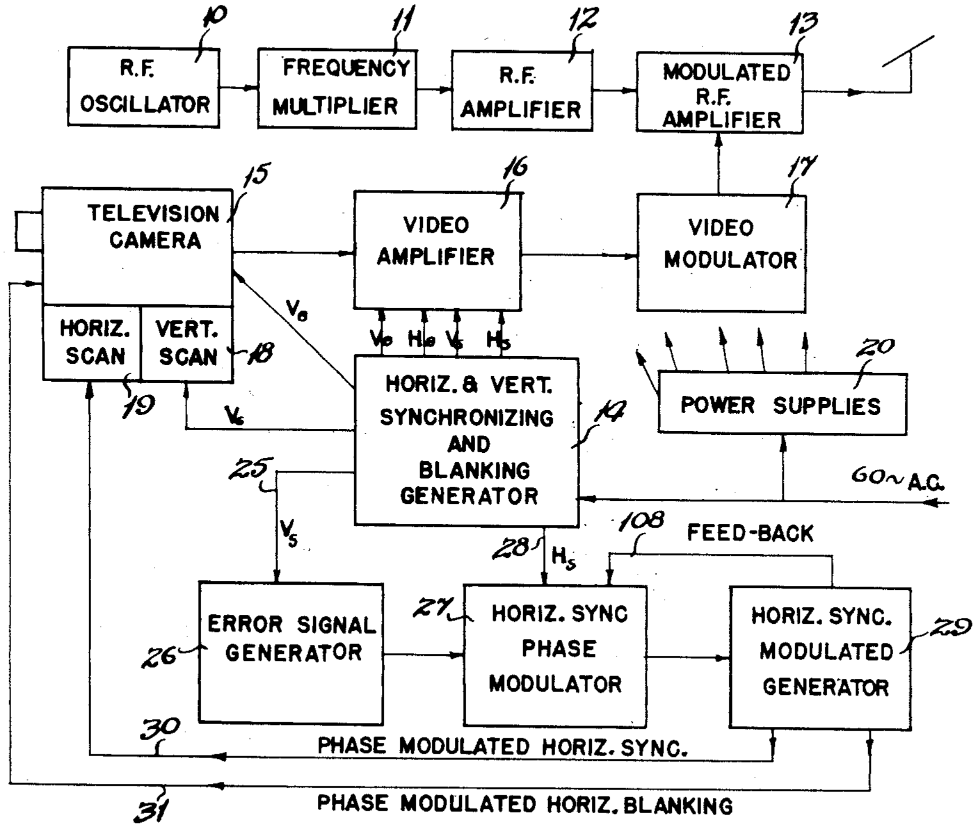
Fig. 1 is a block diagram of the instant system as applied to a conventional television transmitter installation.

Referring to Fig. 1, the essential elements of a conventional television transmitter are shown as modified by components of the instant invention. Radio frequency oscillator 10, multiplier 11, radio frequency amplifier 12 and modulated radio frequency amplifier 13 are conventional. Similarly, television camera 15, video amplifier 16 and video modulator 17 perform their usual functions. Horizontal and vertical synchronizing and blanking generator 14 is the master timing unit which provides precisely timed and shaped signals at suitable voltage levels to feed the television camera 15, the video amplifier 16, the vertical scanning circuit 18 as is conventional, and, as will be hereinafter described, to further feed the horizontal scanning circuits 19 through the horizontal error modulating apparatus. Television camera 15 may take the form of a so-called Image Orthicon or Inconoscope tube which are in general use at the present time. The power supplies 20 feed the various circuits, from a 60 cycle alternating current source. The 60 cycle current may be further used as reference timing means in generator 14.

As is well understood in the art, generator 14 provides standard timing signals which include vertical synchronizing pulses at 60 cycles, vertical blanking pulses also at 60 cycles, horizontal synchronizing pulses at 15,750 cycles and horizontal blanking pulses at 15,750 cycles. Generator 14 further produces equalizing pulses at 31,500 cycles and, by means of known keying and mixing circuits; provides a composite synchronizing and blanking signal. In Fig. 1, the abbreviations VS, VB, HS, etc. represent vertical or horizontal synchronizing or blanking etc. Generator 14 has other known functions which need not be discussed in arriving at an understanding of the instant invention. It will be noted, however, that vertical and horizontal synchronizing and blanking signals are fed to the video amplifier 16 as in conventional practice. Accordingly, the video modulator 17 has applied thereto normal composite horizontal and vertical synchronizing signals, blanking signals and equalizing signals. These modulate the radio frequency amplifier for normal transmission. This expedient assures that any conventional receiver picking up the transmission of the transmitter of Fig. 1 will lock in a normal manner upon the transmitted synchronizing signals.

A fraction of the vertical synchronizing signal from generator 14 is taken off by wire 25, amplified if desired, and fed into unit 26 which comprises a synchronous drive and error signal generator. It is unit 26 that supplies an error signal for modulating the horizontal scanning system of the television camera Generator 26, as hereinafter set forth, is arranged to accept the 60 cycle pulse input of the vertical synchronizing signal and deliver, for example, 181.5 cycle ouput which may be of sine wave form. It may be here noted that since the horizontal synchronizing signal is very stable and is available, it may be employed as the error signal control source for modulating either a secondary horizontal or vertical synchronizing signal. For example, the 15,750 horizontal signal may be sub-divided by a factor of 90 so as to derive 175 cycles which is satisfactory. However, any other factor of division may be used and may be variable in steps at both the transmitter and receiver so as to change the error frequency whenever desired.

The output of error generator 26 is applied to modulator unit 27 which is the horizontal synchronizing signal phase modulator. The primary horizontal synchronizing signal is fed by wire 28 to unit 27 where it partially controls a secondary horizontal synchronizing source, modulated, as more fully described hereinafter, by the output of error signal generator 26. The ouput of unit 29 is the secondary, properly phase modulated horizontal synchronizing signal for controlling the horizontal scanning circuits of the camera.

Basically, generator 29 may be any form of oscillator which can free run at the horizontal scanning frequency (15,750 cycles). It is not permitted to free run, but is instead controlled through modulator 27 for average frequency and instantaneous phase. Control of average frequency and average phase is accomplished through the normal horizontal synchronizing signals from generator 14 while control for instantaneous phase is accomplished through the error signal derived from error signal generator 26. The amplitude of the error signal in modulator 27 will control the degree of phase modulation of the secondary horizontal synchronizing signal provided by generator 29.

Generator 29, as will be hereinafter shown, includes wave shaping and amplification circuits and serves as the phase modulated source for both horizontal synchronizing and horizontal blanking.

The output of generator 29 is fed to the proper section of camera 15 through wire 30 so that the phase modulated synchronizing signal controls the horizontal scanning circuit 19 while the phase modulated horizontal blanking signal is applied through wire 31 so as to control the electron beam intensity in camera 15.

Figure 2:
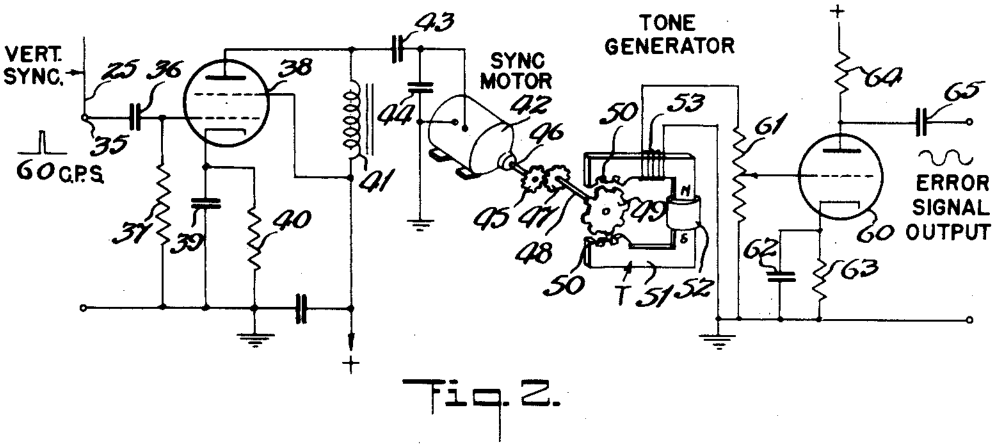
Fig. 2 is a schematic representation of the error signal generator of Fig. 1.

In Fig. 2 are schematically illustrated the elements of generator 26. Wire 25 feeds the vertical synchronizing pulses, usually 60 C. P. S., to the input terminal 35 of generator 26. Condenser 36 and resistor 37 comprise the input grid signal circuit suitable for the 60 cycle input of tube 38. Condenser 39 and resistor 40 provide the usual self-bias. A plate reactor 41 passes direct current to the plate of tube 38 and simultaneously permits the field winding of synchronous motor 42 to be coupled to the output of tube 38 by condenser 43. Thus, the field winding of synchronous motor 42 serves as the plate load of tube 38. If desired, the load circuit may be made resonant at 60 cycles by the employment of a condenser 44 across the field winding.

Synchronous motor 42 is preferably of the self-starting type. It will operate synchronously at 60 C. P. S. at a speed determined by its number of poles. Thus, its speed may be, for example, 30 R. P. S., 15 R. P. S., 7.5 R. P. S., or any other sub-multiple of 60 C. P. S.

A gear 45 connected to shaft 46 of motor 42 drives gear 47 which actuates a phonic wheel tone generator T. Thus, shaft 48 drives rotor 49 operating in field 50 which forms the terminals of core 51. A permanent magnet 52 is disposed around one portion of core 51 as is the pick-up coil 53. The action of magnet 52 will be to pass a variable flux through pick-up coil 53 depending upon the instantaneous position of rotor 49. The electromotive force induced in coil 53 will have a wave form determined principally by the shape and matching of the salient rotor poles and the field poles 50 of the tone generator T.

The frequency of the electromotive force induced in coil 53 will be determined by the number of poles and the speed of rotor 49. This rotor speed is in turn determined by the speed of motor 42 and by the ratio of gears 45 and 47. Thus, the output frequency of tone generator T may have substantially any desired value, controlled by the 60 C. P. S. (or other) input driving pulses. As a further feature of the invention, this output frequency may be given some desired rate of drift as related to the driving 60 C. P. S. input signal. As will hereinafter more fully appear, such drift has the effect of causing the picture errors of unauthorized reception to drift vertically instead of remaining static. As an example of attaining such drift frequency, let it be assumed that motor 42, which is driven at 60 C. P. S., has 15 revolutions per second. Tone generator T is arranged to have an output of 20 cycles per revolution. The gear ratio between gears 45 and 47 may be 60 to 61 in a step-up arrangement. The output frequency of tone generator T will be $$20\times15\times\frac{61}{60}=305\text{ C. P. S.}$$

As will be shown hereinafter, this frequency will have the effect of producing five lateral waves in the picture which waves will further drift vertically, such distortion being eliminated in receivers equipped to provide modified synchronizing pulses as required. It should further be noted that gears 45 and 47 may be elliptical so as to provide an error frequency which has a continuously varying drift rate.

The output of tone generator T is fed through an amplifier tube 60 through potentiometer 61 which provides amplitude control of the error signal. Condenser 62 and resistor 63 provide the usual self bias for tube 60. The error signal appears across the plate load resistor 64 while condenser 65 couples the error signal to modulator 27. It will be evident that the grid circuit of tube 60 may also be employed to alter the wave shape of the signal from tone generator T. Thus, depending upon the tube constants and the like, integration, coupling, differentiation or rectification of the signal may be accomplished so as to provide particularly desired wave forms of output error signal from the plate circuit of tube 60.

It will be understood, therefore, that the error signal generator above described is essentially a mechanical motor generator set of low power, driven by an amplifier tube 38 and delivering its output through a second amplifier tube 60. Such output may have a pre-selected amplitude, frequency, wave-shape and phase as related to the input driving signal.

Figure 3:
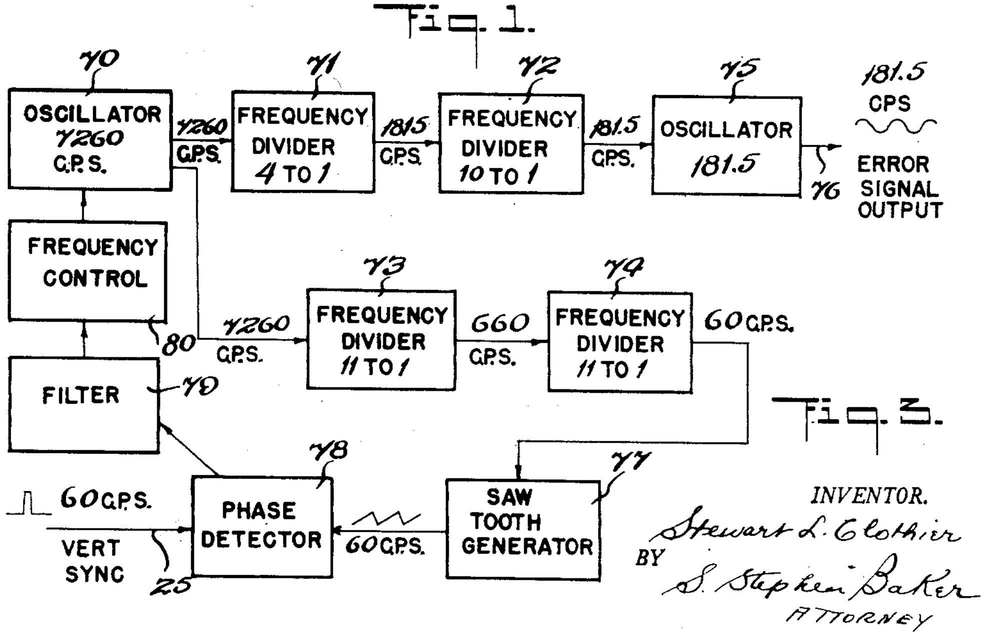
Fig. 3 is a modification of the generator of Fig. 2 in block form wherein the components are fully electronic as opposed to the mechanical elements illustrated.

In Fig. 3 is illustrated a fully electronic method of generating the error signal so that Fig. 3 represents a modified form of the apparatus disclosed in Fig. 2. Oscillator 70 may be of any conventional type either sine wave or relaxation and adjustable to run freely at or near the desired frequency which, in the present example, is 7260 C. P. S. 71, 72, 73 and 74 are frequency divider or count-down stages and may comprise diode step counters with blocking oscillators or may be multi-vibrators. If desired, buffer stages may be included.

In Fig. 3, stage 71 is adjusted for a 4 to 1 division so as to provide a frequency of 1815 C. P. S. Stage 72 is adjusted for 10 to 1 division so as to provide a frequency of 181.5 C. P. S. This frequency may, if desired, control a sine wave oscillator 75 which has a normal frequency of 181.5 C. P. S. It is evident that the output of oscillator 75 may be of other than sine wave form such as saw tooth or other form. In any event, the output at wire 76 is the error signal and it is under the control of oscillator 70.

It is necessary, however, in the particular form shown, that this error signal be controlled by the vertical synchronizing signals so that its angular speed (radians per second) will bear a substantially fixed ratio to the angular speed of the 60 C. P. S. vertical synchronizing signals. Accordingly, a second count-down chain comprising stages 73 and 74, likewise controlled by oscillator 70, is, in the form shown, arranged for 11 to 1 division each so that the output of these stages is respectively 660 C. P. S. and 60 C. P. S. A discharge tube and resistor-condenser circuit in stage 77 convert this output to saw tooth form for application to a phase detector 78. Phase detector 78 may be of conventional form such as a discriminator employing a duo-diode tube. One type thereof is illustrated in detail in Fig. 4.

The 60 C. P. S. pulses from the main vertical synchronizing source as from wire 25 are also applied to phase detector 78. These are compared in the detector with the 60 C. P. S. saw tooth wave from generator 77 and a control voltage is obtained which is fed through a low pass filter 79 and a D. C. amplifier frequency control 80 to control the frequency of oscillator 70.

The electronic error signal generator described will not only be stable and provide the desired frequency and wave shape of the output error signal, but will further insure that the error signal will be positively controlled by the vertical synchronizing signals so as to bear a substantially fixed ratio to the angular speed of the vertical synchronizing signals.

As set forth above, it is considered effective and desirable for the purposes of this invention to provide a slow drift rate between the vertical synchronizing signal and the error signal. The drift may be positive or negative and is considered to be particularly effective at rates from a fraction of 1 C. P. S. to several C. P. S. As a means for rendering more easily understandable the effect of the drift rate, let us assume that a conventional cathode ray oscilloscope is adjusted to a 60 C. P. S. time base and locked to the vertical synchronizing pulses. The error signal is then applied so as to be viewed as a wave form on this oscilloscope. As a result of such action, the error signal would appear as three cycles of a wave form which move slowly across the oscilloscope screen, either to the right (positive) or to the left (negative). By using other multiples of the vertical synchronizing frequency (including slight deviations from exact multiples) other wave forms will appear such as, for example 2 to 10 or 20 cycles similarly drifting. Thus, if exactly 120 C. P. S. were used for the error signal, two wave form cycles would be evident. Such wave forms would be locked on the screen. It is considered that this example is not as effective as one which drifts. If 181.5 C. P. S. is used for the error signal, then three wave forms appear on the screen with a slow drift to the right. This particular error signal is considered to be very effective in producing sufficient distortion so as to render the transmission substantially valueless to unauthorized receivers. Similarly, a frequency of, let us say, 359 C. P. S. produces six cycles on the screen with a slow drift to the left. It will be apparent that the frequency of oscillator 70 may be other than that illustrated whereupon the dividing units will have other step down ratios. For example, its frequency may be 2940 C. P. S. and stages 71 and 72 may count-down 5 to 1 each resulting in an error signal of 117.6 C. P. S. Stages 73 and 74 may have 7 to 1 ratios to produce the 60 C. P. S. output. Each count down or divider unit is disclosed as having variable bias for its blocking oscillator so that the ratio of frequency division can be manually controlled in steps. Accordingly, a wide choice of error signal frequencies is made possible with periodic change as desired.

Figure 4:
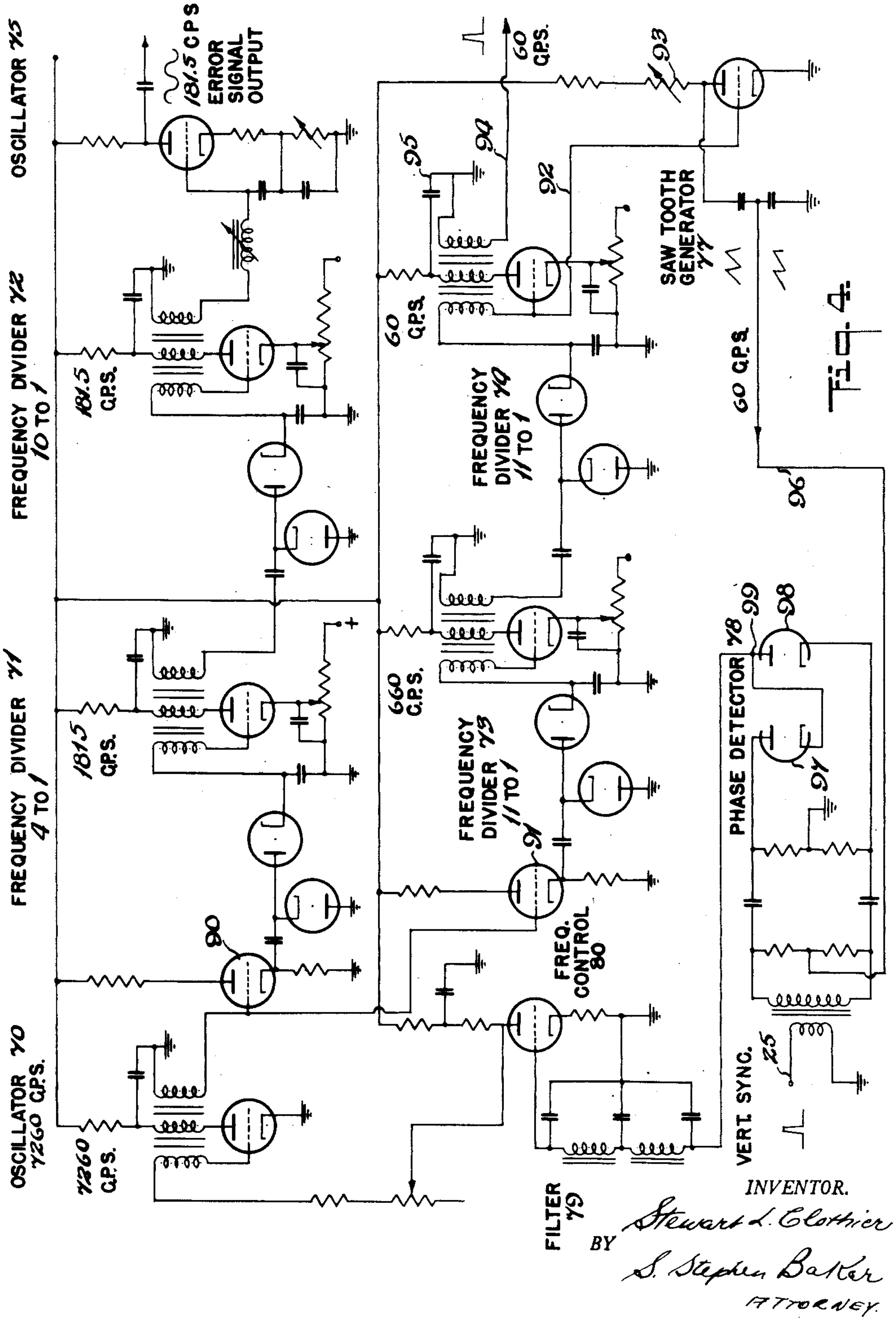
Fig. 4 is a schematic representation of the modification disclosed in Fig. 3.

In Fig. 4 is illustrated a schematic circuit which accomplishes the results of the block diagram of Fig. 3. It will be there observed that oscillator 70 is a blocking oscillator, while the count-down or divider stages 71 and 72 also include blocking oscillators, the final stage feeding oscillator 75 which may be a sine wave oscillator of the Colpitts type as illustrated. Each divider chain may be preceded by buffer tubes 90 and 91.

The output of divider stage 74 at wire 92 is applied to generator 77 which serves to convert or shape the signal into saw tooth form. Variable resistor 93 serves to adjust the amplitude of the saw tooth wave. Wire 94 carries another output of divider stage 74. The output at wire 94 is essentially of pulse form.

The output of saw tooth generator 77 is applied through wire 96 to the phase detector 78. It will be understood by those skilled in the art that the phase detector circuit shown is similar to automatic frequency control synchronization circuits which are in current use in television receivers. A description of the action thereof is found in the publication "Proceedings of the IRE" vol. 31, No. 1, January 1943. Briefly, the phase detector 78 compares the incoming 60 C. P. S. synchronizing pulses from wire 25 and the saw tooth wave, and generates a control signal which varies in accordance with the difference in the phases.

The diodes 97 and 98 are peak detectors which operate to hold the peaks of the synchronizing pulses at zero potential. Point 99 assumes the average potential existing between the waves at the instant when the synchronizing pulse occurs. If a small phase displacement occurs between the synchronizing pulses and the saw tooth, the peaks of synchronizing continue to be maintained at zero potential, but the average potential at point 99 is lowered or raised, depending upon whether the pulse moves to an advanced or to a retarded position in time relative to the saw tooth. Potential variations at point 99 are applied to the low pass filter 79 which removes high frequencies and passes only low frequency components of the signal. These low frequency components serve to adjust and control the phase of oscillator 70 by the phase of the synchronizing signal compared with the output of the saw tooth generator 77. The potential variations at point 99 are applied through filter 79 and frequency control 80 to the lower end of the grid resistor of oscillator 70. It will be understood that this action constitutes a feed-back circuit for changing the oscillator frequency in accordance with the phase differences between the saw tooth wave and vertical synchronizing signal.

The error signal output from generator 26, whether semi-mechanical or electronic as described above, is applied to modulator 27 together with the horizontal synchronizing signal as illustrated in Fig. 1 and the resulting controlling signals are applied to generator 29 so as to produce the phase modulated horizontal synchronizing and blanking signals. Elements 27 and 29 as shown in Fig. 1 are illustrated in detail in Fig. 5 which is a combined schematic disclosing a typical arrangement for performing the functions of phase modulator 27 and generator 29.

Figure 5:
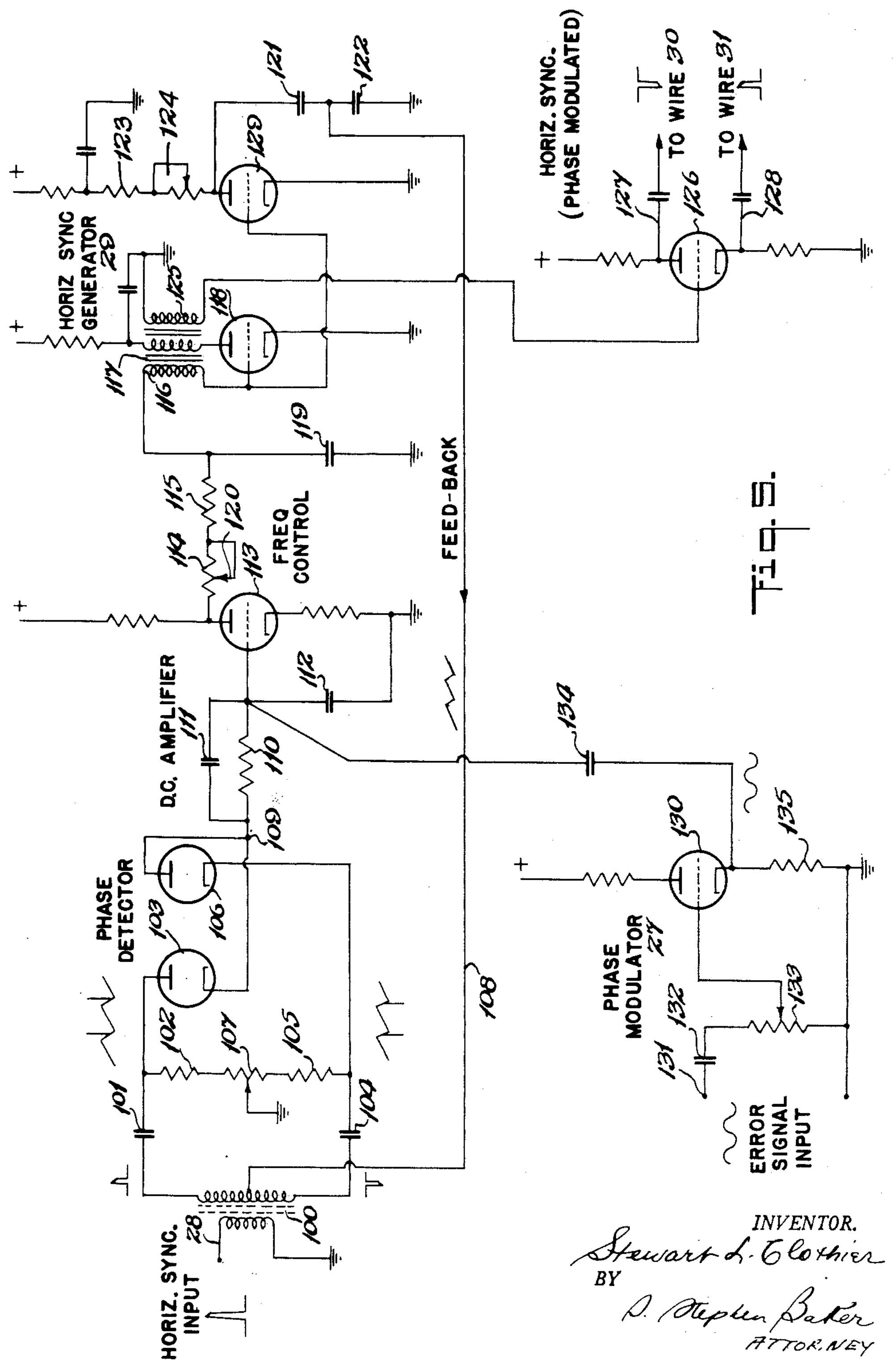
Fig. 5 is a combined schematic representation of the horizontal synchronizing phase modulator and horizontal synchronizing modulated generator as illustrated in the blocks of Fig. 1.

Referring to Fig. 5, the stable horizontal synchronizing pulses from master synchronizing generator 14 are applied through wire 28 to the input transformer 100 of modulator 27. The circuit shown is essentially a phase detector circuit such as that previously described. The center tapped secondary of transformer 100 feeds positive pulses through the coupling circuit comprising condenser 101 and resistor 102 to the plate of diode 103. Negative pulses are fed through the coupling circuit comprising condenser 104 and resistor 105 to the cathode of diode 106. The ratio of resistors 102 and 105 may be varied slightly by potentiometer 107 to obtain an accurate balance of this phase bridge circuit. As will hereinafter appear and as illustrated, a feedback path is provided by wire 108 for delivering saw tooth waves to the center tap of the secondary of transformer 100.

The output of the phase detector comprising diodes 103 and 106 is combined at point 109 and is passed through the low pass filter comprising resistor 110, condenser 111 and condenser 112 to the grid of amplifier tube 113. Tube 113 amplifies low frequencies and direct current as does its counterpart in frequency control 80 shown in Fig. 4. The plate of tube 113 is directly connected through resistors 114 and 115 to the grid winding 116 of transformer 117 which is a component of blocking oscillator 118. The frequency of blocking oscillator 118 is determined partly by the time constant of resistors 114 and 115 with condenser 119 and partly by the potential at the plate of tube 113. This potential is manually adjustable by potentiometer arm 120.

Each time that blocking oscillator 118 fires, tube 129 becomes heavily conducting and discharges the condenser combination 121 and 122. Between firings, tube 129 is biased beyond cut-off, allowing condensers 121 and 122 to re-charge through resistors 123 and 124. This action produces the desired saw tooth voltages with a linear rise and fast re-trace. This saw tooth voltage is applied through wire 108 to the center top point of the secondary winding of the transformer 100 as shown.

A third winding 125 on the feedback transformer 117 of blocking oscillator 118 provides pulses with each firing which are employed to drive the grid of tube 126 serving as the output amplifier and shaper. The output of tube 126 represents the horizontal synchronizing and blanking pulses modulated as hereinafter described, by the error signal. These may be taken either from wire 127 or from wire 128 depending upon the required polarity. Disregarding such error modulation for the moment, the units of modulator 27 and generator 29 as thus far described, are essentially a horizontal synchronizing signal repeater. With the frequency control resistor 114 properly adjusted by arm 120 to control oscillator 118, the output synchronizing signal from tube 126 will be firmly locked to and controlled by input synchronizing signal to the transformer 100. However, the phase between the input and output pulses may be adjusted by manual variation of the potentiometer arm 120. For example, were these pulses to be compared on a dual oscilloscope, it would be found that manual variation of the potentiometer arm 120 can cause the output pulses to lead or lag the input pulses by considerable phase angles. In other words, for a considerable range of adjustment of resistor 114, the ouput frequency will be the same as the input frequency so that variable resistor 114 which would normally be considered a frequency control, is actually operating over this range as a phase control only.

At some point of adjustment of resistor 114, oscillator 118 unlocks. If the high and low limits of adjustment of resistor 114 are noted where oscillator 118 becomes unlocked, and, disconnecting the horizontal synchronizing input to transformer 100 and measuring the actual free-run frequencies for oscillator 118 for both the high and low limiting positions of resistor 114, it will be found that oscillator 118 will run as high as 18 kilocycles and as low as 14 kilocycles. It is assumed, of course, that the normal center of the locking range of oscillator 118 is 15,750 C. P. S. This indicates that once the system is locked-in, it will stay locked-in over a wide range of adjustment and that this adjustment which for free-run provides a difference of over 20% in operating frequency, now gives only a plus and/or minus phase shift.

Referring now to the error signal input and the phase modulator tube 130, the signal applied to terminal 131 may be the 181.5 C. P. S. error signal output from wire 76 of Fig. 4. This signal, which may be of sine wave form, is applied to the grid of tube 130 through coupling condenser 132 and amplitude control potentiometer 133. From the cathode of tube 130, an in-phase signal is produced by the cathode follower output and coupled to the grid of tube 113 through condenser 134. The amplitude of the signal introduced at the grid of tube 113 will be partly determined by the ratio of condensers 134 and 112. Condenser 134 and resistor 135 become a portion of the low pass filter comprising condensers 111 and 112 and resistor 110.

As described above, the voltage at the plate of tube 113 is one factor controlling the instantaneous phase of blocking oscillator 118 which in turn determines the phase of the output synchronizing signal of tube 126. Accordingly, dual control by means of tube 113 is accomplished such that, in the locked and centered adjustment, the output synchronizing signal (as well as the output of oscillator 118) will agree with the stable horizontal synchronizing input in average frequency, but the output pulses will be phase modulated with respect to the input pulses and this phase modulation will be controlled by the error signal. It will be recognized that the introduction of the error signal to the grid of tube 113 is substantially equivalent to adjustment of potentiometer arm 120 in determining the phase of the output signal.

The frequency of the error signal will determine the rate of deviation of phase of the synchronizing output whether plus or minus. The amplitude of deviation, i. e. the amount of lag and lead will correspond to the amplitude of the error signal. Accordingly, to horizontal scanning section 18 of television camera 15, are delivered the desired phase modulated horizontal synchronizing signals.

As stated, television camera 15 then scans the scene to be transmitted under the direct control of the normal vertical blanking and synchronizing signals and the modulated or phase displaced horizontal synchronizing and blanking signals. The vertical scanning is then essentially normal, while the horizontal scanning is phase modulated as required.

If the camera tube is a type requiring keystone scanning (such as an Iconoscope), the necessary amplitude modulation of the horizontal scanning signal may be added to the camera horizontal scanning amplifier while still maintaining the described phase modulation. The video output is applied to amplifier 16 to which are also applied normal horizontal and vertical synchronizing and blanking signals which are counterparts of the corresponding signals used in the scanning process. The carrier is modulated, as above described, by the output of modulator 17 and broadcast thereafter. While it is probably preferable to utilize phase modulated horizontal blanking in the camera, the operation is also satisfactory when normal horizontal blanking is employed.

Particular circuits and functions must be added to a normal television receiver to enable it to properly receive the scenes so transmitted. Essentially, the horizontal scanning signals in the receiver are phase modulated so as to correspond to the phase modulations which were deliberately introduced in the transmitter scanning process. In this way, the transmitted video phase errors are corrected so as to render the received picture intelligible.

Figure 6:
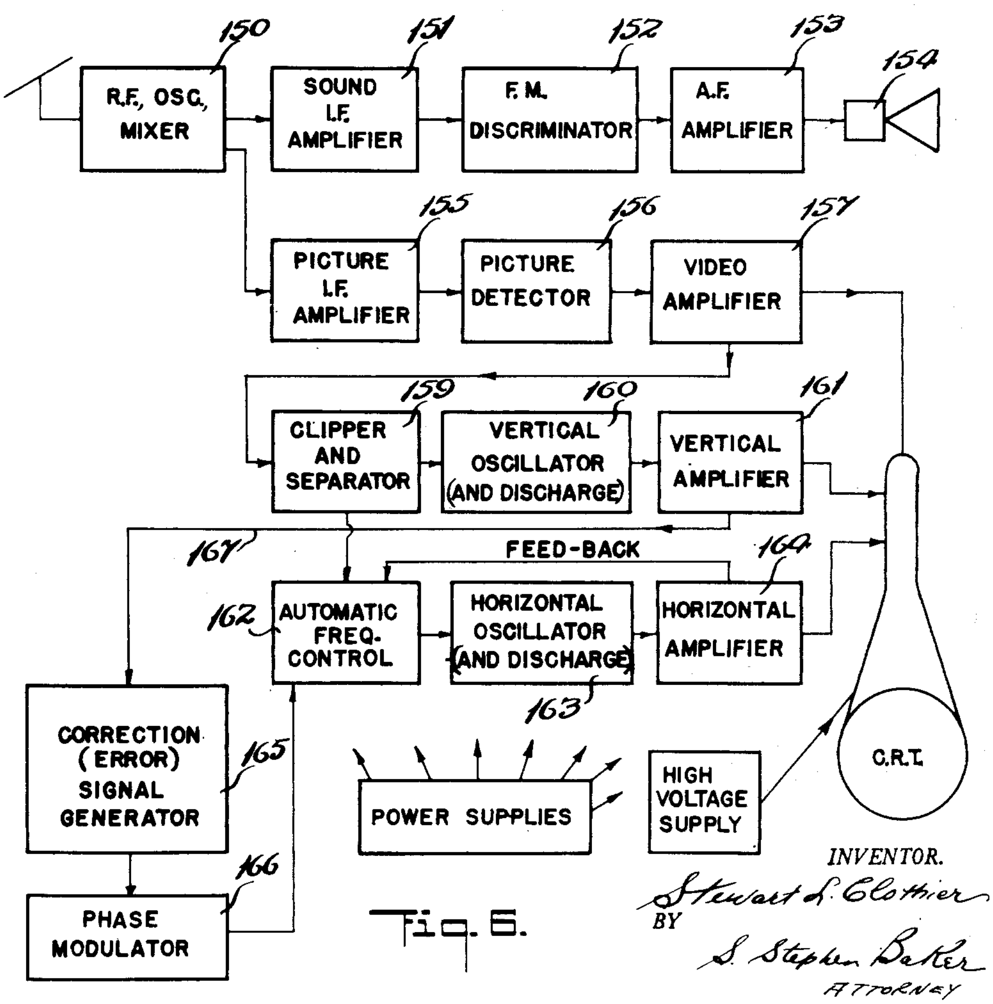
Fig. 6 is a block diagram of a television receiver originally incorporating automatic frequency control and provided with the improvements of the instant invention.

Fig. 6 illustrates in block form a television receiver which has been modified by components of the instant invention. The front end 150 is conventional. The output of front end 150 consists of two lower frequency bands, one being the sound modulated intermediate frequency and the other being the video intermediate frequency carrier with its amplitude modulation sidebands. The sound channel comprising amplifier 151, discriminator 152, amplifier 153 and speaker 154 are conventional. The transmitter broadcasts normal sound signals and any receiver, in the form shown, may receive the same.

The video intermediate frequency carrier is amplified in a wide band picture intermediate frequency amplifier 155 and applied to picture detector 156. This detector demodulates the carrier and side-bands to provide a composite video-synchronizing-blanking signal. This signal is amplified in a wide band video amplifier 157 (generally 30 C. P. S. to 4.5 mc.) and the output fed to a control grid in the cathode ray viewing tube. A fraction of the output of amplifier 157 is fed to a synchronizing signal separator and clipper 159 where composite horizontal and vertical synchronizing signals are amplified, while video signals are clipped and rejected. Separator 159 separates the vertical 60 cycles pulses from the 15,750 cycle horizontal synchronizing pulses. These vertical pulses are, after being integrated or the like, applied to vertical scanning oscillator 160 so as to maintain the frequency and phase of such oscillator exactly synchronous with the vertical synchronizing pulses.

The output of oscillator 160 provides a precise wave form at 60 C. P. S. for driving the vertical scanning amplifier 161. Amplifier 161 is coupled to the vertical deflection means of the cathode ray tube and produces the desired vertical deflection of the electron beam.

Separator 159 also applies horizontal synchronizing pulses at 15,750 C. P. S. to an automatic frequency control circuit 162. Control circuit 162 is not employed in all television receivers, but a large majority particularly those employing electro-magnetic scanning are so equipped to produce so-called "fly wheel" synchronizing, the prime purposes of which are stability, noise immunity and freedom from spurious signal effects. The instant invention is applicable to television receivers whether or not they employ control circuit 162 since, in cases where they do not, the synchronizing signal from separator 159 is directly applied to the horizontal scanning oscillator instead of to the automatic frequency control circuit. In receivers where control circuit 162 is employed, its output is applied to horizontal scanning oscillator 163 which, in the particular receiver shown, is provided with the illustrated feed back for frequency control.

The receiver as hereinabove described is conventional. Its components have been briefly set forth in order to clarify the function of the circuits which are added thereto pursuant to the instant invention. Normally, the output of oscillator 163 is first given proper shape as to wave form and is then applied to the control grid circuit of amplifier 164 to serve as grid drive therefor. The output of amplifier 164 is then delivered to the horizontal deflection yoke of the viewing tube and produces conventional horizontal scanning. In the present invention the grid drive of amplifier 164 is phase modulated, resulting in phase modulation of scanning and this is accomplished by directly phase modulating oscillator 163 or by adding a second oscillator which is phase modulated and which is locked with oscillator 163 for average frequency.

In the conversion or provision of a receiver according to the instant invention, a correction signal which is a substantial duplicate of the error signal used in the transmitter must be supplied. The correction signal should correspond to the error signal in regard to frequency, phase, and wave shape, but not necessarily in amplitude. It will be evident that such a signal could be delivered to the receiver directly by wire from the transmitter site, since this signal is in most cases a comparatively low audio frequency. It will be further evident that the correction signal could be transmitted as modulation of a radio frequency carrier at substantially any desired carrier frequency. Such modulation would require considerably less band width than ordinary voice modulation. It is preferable, however, to generate the desired correction signal at the receiver for reasons of increased secrecy and other advantages.

While the correction signal may be derived from a generator at the receiver which generator is synchronously driven directly from the 60 cycle A. C. power supply circuit, it is considered preferable to derive it from the synchronizing signal separator circuit. Conventional television receivers have circuits provided therein for the separation and use of the normal, stable, synchronizing pulses, both vertical and horizontal. These pulses correspond to those generated at the transmitter. As described above, the vertical synchronizing signals were used to control an error signal generator and the error signal was used to phase modulate the camera scanning. It will be evident, however, that the horizontal synchronizing signals may be used to control the error signal generator of the transmitter, in which case the normal horizontal synchronizing pulses in the receiver would be used to control its correction signal generator. In the form shown, the separated vertical synchronizing pulses are used to provide the necessary control of the driving of the receiver correction signal generator so as to maintain its synchronization with the error generator of the transmitter.

As will hereinafter appear, the correction signal generator and synchronizing drive may be substantially identical with the error signal generator and synchronizing drive of the transmitter, including both the mechanical and electronic types disclosed. It is practical, of course, to employ an electronic error signal generator at the transmitter and a mechanical correction signal generator at the receiver as long as frequency, phase, and wave shape correspond.

In addition to a correction signal generator for the receiver, there is provided a phase modulator and a phase modulated driving source for the horizontal scanning circuit. In this way, horizontal scanning at the receiver will be maintained at the stable and normal horizontal synchronizing average rate, and at a substantially fixed average phase with respect to the stable and normal horizontal synchronizing signals, but, said horizontal scanning is nevertheless phase modulated by the correction signal. Such phase modulation, being continuous and uniform, does not disturb stabilized action of the horizontal oscillator as would an interrupted signal.

In conventional television receivers containing the "fly wheel" circuits above described, the addition of the phase modulation is very simple. It is performed by coupling the correction signal into the frequency control circuit of the horizontal scanning oscillator whether such oscillator be sine wave or of the relaxation type. A convenient point in the circuit for introduction of the correction signal is in the low pass filter which forms a part of the frequency control section of all such circuits. This filter determines the inertia of the "fly wheel" effect and the degree of noise immunity. It has been found that such control circuits will accept the correction signal so as to perform the required phase modulation and that they will do this without any substantial loss of the noise immunity and electrical inertia for which they were originally designed, provided, of course, that the correction signal amplitude is within operating limits. For example, too great an amplitude may interfere with or destroy synchronization. It has been found that deviations or excursions in phase in the order of plus or minus 15 to 40 degrees from normal are entirely satisfactory. While further deviations are operative, it has been found that within this range the necessary phase modulation may be provided and synchronization maintained satisfactorily and without undue complications in correcting the reception.

The output of the frequency controlled horizontal scanning oscillator as modulated, is used to control the grid drive for the horizontal scanning output amplifier. As a result, actual scanning on the viewing tube is phase modulated by the correction signal as required.

The corrective action at the television receiver may be applied thereto regardless of whether or not it employs "fly wheel" or automatic frequency control circuits. This expedient will be described hereinafter.

The application of the instant invention to a conventional television receiver, has the same objective in all types of receivers, that is, to produce phase modulation of the receiver horizontal scanning by the above mentioned correction signal. The actual method of doing this may be determined to some extent by the existing circuits in any particular receiver although it is evident that receivers may be initially constructed with the invention applied thereto.

For the purposes of the instant invention, television receivers may be considered in two preliminary groups, those having "fly-wheel" stabilizing circuits in their horizontal synchronizing sections and those not having such stabilization. A further classification as related to the instant invention is the method of scanning, which may be electro-magnetic or electro-static.

The invention is conveniently applied to any receiver having a "fly-wheel" circuit for control of horizontal scanning. There are many circuits in general use for the provision of this control action. Some receivers employ sine wave oscillators with reactance tube control, while others use relaxation oscillators with direct control. In all such circuits a phase sensitive device is employed and a feed-back path is provided. The incoming synchronizing pulses are compared with feed-back and a control voltage is obtained. This control voltage is applied, usually thru a low pass filter, to the reactance tube or other oscillator control point and results in stabilized control of the output and the scanning both as to frequency and phase.

In all such circuits, it has been found that they will continue to perform their normal stabilizing functions and to provide high degrees of noise immunity while at the same time performing the new added function which this invention requires, that is, phase modulation of the horizontal scanning oscillator by the correction signal. This is true both for electro-magnetic types and for electro-static types, since in both cases, the horizontal scanning oscillator is the true source and control of subsequent scanning action and said scanning oscillator determines the frequency and the phase of the final scanning. Thus, any phase modulation of the horizontal scanning oscillator results directly in phase modulation of the final horizontal scanning of the receiver screen.

As mentioned above, it is customary to include a low-pass filter as a part of any "fly-wheel" scanning circuit. This filter portion of such circuits provides a most suitable point for the injection of a low frequency correction signal for phase modulation. For any single and particular "fly-wheel" circuit, there are of course, several points which may suitably serve for the injection of the correction signal. It may, for example, modulate the oscillator cathode voltage, it may be applied to the phase sensitive portion of the circuit or it may be connected to combine with the feed-back potential. In general it is preferable, although not essential, to perform this function directly in the low-pass filter which in turn passes controlling voltages to a frequency and phase controlling grid circuit.

Generally, when the correction signal source is connected to the control circuit, the degree of phase modulation produced will depend upon the correction signal amplitude. The practice of this invention requires only a comparatively minor shifts in phase, that is, sufficient to give scanning shifts of about plus and minus 10%. In terms of phase this would represent plus and minus 36°. Such phase shifts are readily obtained by proper selection of amplitude of the correction signal. Although considerably greater shifts are also readily obtainable, they are, in general, not required.

In applying this invention to television receivers which do not have "fly-wheel" horizontal synchronizing and scanning included in their original design, it is possible to connect the correction signal to a suitable point of the horizontal oscillator to control its phase. However, for purposes of stability and exact reproduction of the transmitter, scanning errors, it is preferable to make several changes and additions, including, of course, the correction signal generator above described. Fundamentally, the separated, normal, stable horizontal synchronizing signal is given a new path in its control of the horizontal scanning oscillator and provision is made for phase modulation of the horizontal scanning oscillator by the correction signal, with respect to the normal stable horizontal synchronizing signal. Accordingly, a feed-back path is provided, a phase detector is added and the feed-back wave and stable horizontal synchronizing signal are compared in this detector. The detector output is fed through a low pass filter to directly control the scanning oscillator average frequency and average phase. The correction signal is connected to provide additional control of the horizontal scanning oscillator either through the same low pass filter or by connection to some other controlling point of the horizontal scanning oscillator and means are provided for manual adjustment of the correction signal amplitude.

The final result of the changes and additions is that the horizontal scanning process of the receiver, whether electro-magnetic or electro-static, although still positively controlled by the received horizontal synchronizing signal for average frequency and average phase, has nevertheless been slightly released from this control to permit additional phase variations, which variations are determined by the correction signal.

It is customary in television receivers to have the horizontal scanning oscillator control a discharge circuit to provide a saw-tooth or a saw-tooth-pulse combined wave which is amplified by a scanning output tube or tubes. These latter functions and stages are retained in the circuit and the feed-back mentioned above is obtained from a suitable point in this latter portion of the horizontal scanning circuit.

The above description assumes the use of a relaxation oscillator with direct control of frequency and phase. It may in some cases be desirable to eliminate the original horizontal scanning oscillator and replace it with a sine wave oscillator and reactance tube control. In such cases, the phase detector output and the correction signal would operate through the reactance tube to provide the required frequency and phase control.

Referring to Fig. 6, units 165 and 166 have been added to the conventional television receiver so as to phase modulate its horizontal scanning oscillator for providing the required corrective action. Vertical scanning amplifier 161 is connected by wire 167 to unit 165, termed the synchronizing drive and correction signal generator. Generator 165 may exactly duplicate that shown in Fig. 2 or 3, either of which is used in the transmitter. It is positively controlled by the vertical scanning frequency as was its counterpart in the transmitter. This control includes both its output frequency and its basic phase. Manual control of its output phase is provided as hereinabove set forth as may be control of its amplitude, wave shape and frequency.

The output of generator 165 is applied to a phase modulator or phase control 166 which is connected into the automatic frequency control unit 162 so that the output of the horizontal scanning oscillator and discharge 163 will be phase modulated and then amplified as modulated in horizontal scanning amplifier 164. The function of amplifier 164 is well known. Briefly, it delivers the necessary energy for scanning and for high voltage "kick back" power supply. Such power supply function will be effected whether the horizontal scanning signal is phase modulated or not. The phase modulation, however, will supply the corrective scanning in accordance with the transmitter action.

Figure 7:
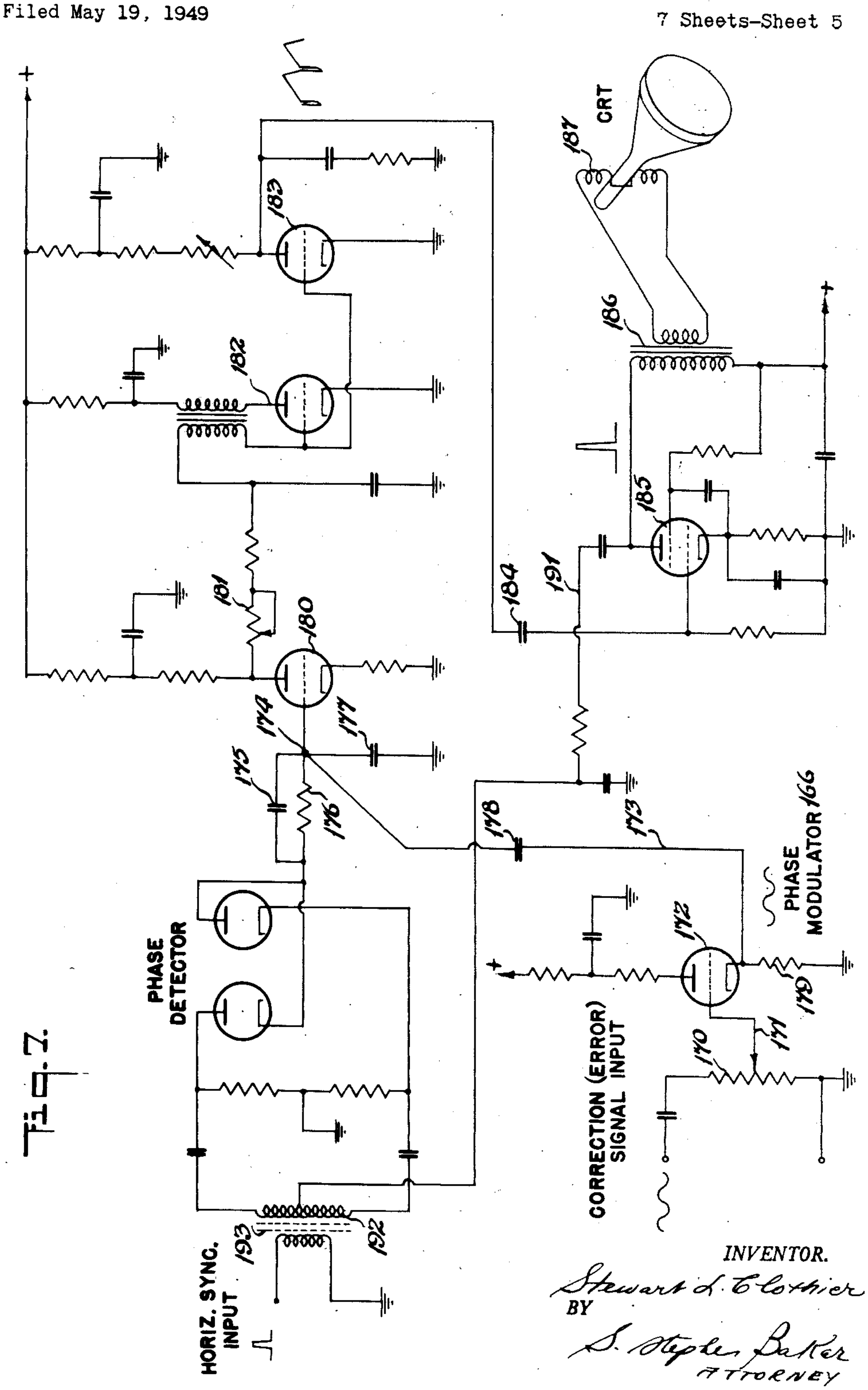
Fig. 7 is a schematic representation illustrating the application of the error or correction signal so as to produce a phase modulated horizontal scanning signal.

Fig. 7 is a schematic diagram illustrating in detail the modulation of the horizontal scanning signal as shown in block form in Fig. 6.

Fig. 7 is a portion of a television receiver which includes an automatic frequency control having a duo-diode phase detector and low pass filter. It will be recognized that the circuit of Fig. 7 is similar to that of Fig. 5 which is used in the transmitter so that a detailed explanation thereof is unnecessary. Briefly, the correction signal from unit 165 appears across potentiometer 170, the arm 171 of which is connected to the control grid of tube 172. Tube 172 is the phase modulator or phase control and it is employed as a cathode follower for impedance matching and other purposes. Its output is applied through wire 173 to point 174 which represents the output of the low pass filter comprising condenser 175, resistor 176 and condenser 177. It will be noted that the connection of wire 173 changes the capacity of the filter in that condenser 178 and resistor 179 are added thereto. Tube 180 serves as a low frequency amplifier and frequency control as does tube 133 (Fig. 5) of the transmitter, and potentiometer 181 may serve the same function as transmitter potentiometer 114. The resulting control signal is then used to phase modulate blocking oscillator 182. Oscillator 182 controls discharge tube 183, the output of which is properly shaped as shown and applied through condenser 184 to the control grid of tube 185 in the horizontal scanning signal amplifier 164. The output of tube 185 or amplifier 164 is applied through transformer 186 to the horizontal deflection coils 187 pursuant to conventional practice.

Figure 8:
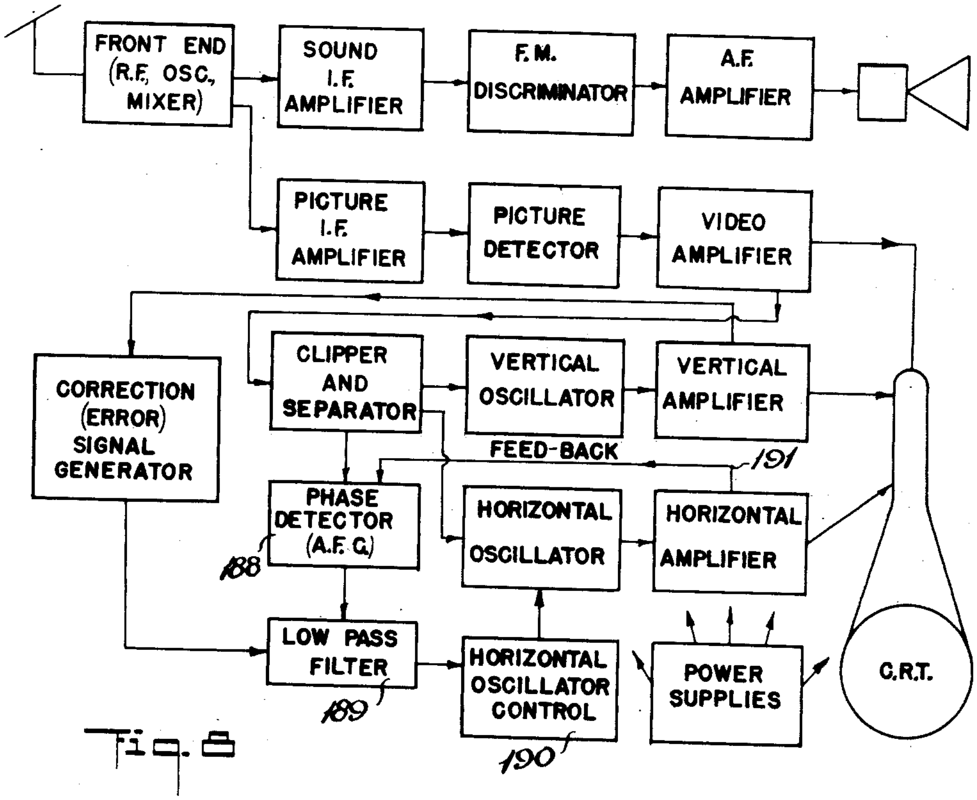
Fig. 8 is a block diagram of the instant system as applied to a television receiver without original automatic frequency control.

The circuit of Fig. 7 illustrates electro-magnetic scanning of the cathode ray tube in a receiver having automatic frequency control. In receivers not having automatic frequency control, the output of horizontal scanning oscillator 163 is normally applied directly to amplifier 164 and thence to the deflection circuits. Referring to Fig. 8, in such receivers the instant invention is best adapted thereto by adding the phase detector 188, the low pass filter 189 and horizontal oscillator control 190 so as to effectively add automatic frequency control to a set which is not so equipped. Horizontal oscillator control 190 is the same stage as frequency control 180 of Fig. 7 or 113 of Fig. 5. In those sets which employ electromagnetic scanning, the feed-back wire 191 may be taken from the plate of tube 185 integrated into saw tooth form, and connected to the center of the secondary winding 182 of transformer 193 which is added to the set together with the automatic frequency control circuit. However, it will be apparent that a saw tooth feed-back voltage may be taken from many points in the scanning circuit.

The invention is also obviously adapted to sets employing electro-static scanning whether such sets employ straight synchronizing or "fly-wheel" synchronizing. In such sets which employ straight synchronizing the adaptation of Fig. 8 is employed and the feed-back wire is taken from the horizontal scanning amplifier since it already is of saw tooth form. Suitable voltage division is, of course, included in such feed-back action.

Most of the electromagnetic sets employ "fly-wheel" synchronizing and various circuits exist for accomplishing this function. Thus, a conventional and common circuit employs a sine wave oscillator, a reactance tube frequency control, a separate duo-diode for phase detection, and a discharge tube for obtaining a saw tooth and pulse horizontal driving signal under full control of the sine wave. The correction signal may be fed, in this case, to either the low-pass filter as above described, to the output of the reactance tube which controls the sine wave oscillator or to any conventional control point of the horizontal oscillator which will produce the required phase shift as will be well understood by those skilled in the art.

Figure 9:
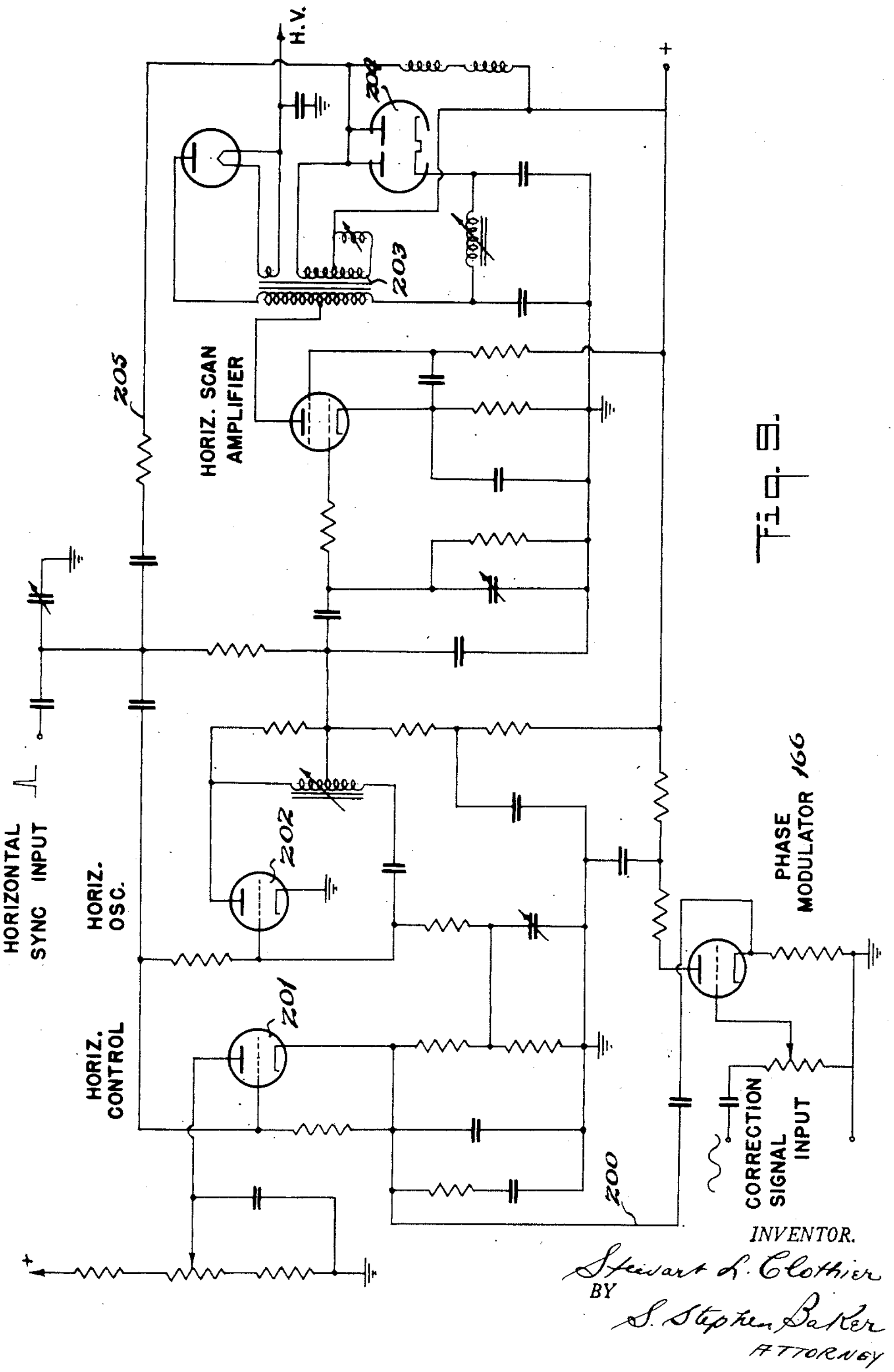
Fig. 9 is a schematic representation similar to Fig. 7 but illustrating the application of the invention to a modified form of receiver.

Another widely used and simplified circuit combines most of these functions in a single dual triode tube. One triode serves as phase detector, direct current amplifier, feed-back and control tube, while the other is a blocking oscillator and discharge tube combined. Fig. 9 illustrates the application of the phase modulator 166 to such a circuit. It will be noted that the output of the phase modulator is applied through wire 200 to the cathode follower output of triode section 201 where it controls the phase of blocking oscillator triode section 202. The output of triode 202 is then amplified in the usual manner and applied through transformer 203 to the horizontal deflection coils. Suitable damping is provided by tube 204. The feed-back line for the phase detector action is through wire 205.

It will be understood from the foregoing that the principal and basic change in operation resulting from this phase modulation of the horizontal driving signal is that the horizontal scanning is itself likewise phase modulated by a derivation of the vertical synchronizing signal and the purposes of the invention are thereby achieved. This is true for all receiver designs and types such as described above regardless of what type of deflection is employed and whether or not automatic frequency control circuits in the original design of any particular receiver is incorporated. In all cases, the objectives of the invention can be realized by introducing phase modulation of the horizontal scanning driving signal ahead of the final horizontal scanning amplifier which produces horizontal scanning of the cathode ray tube. The resulting phase modulated scanning is controlled by the correction signal and by the transmitted and received stable horizontal synchronizing pulses. The result may be otherwise described by pointing out that the successive initiations of horizontal scanning are cyclically caused to lead and to lag some mean value of repetitive timing and this mean value is determined by the normally transmitted stable horizontal synchronizing pulses, whereas the cyclical variation is produced by a local error signal for accomplishing the required correction. The wave utilized for the error or correction signal may be of diverse form whether or not sine wave or sine wave with a desired harmonic content. Frequencies are best in the audio range with lower frequency values having certain advantages as above set forth. The phase of the error signal may be continuously changing with respect to the stable synchronizing signals or it may be constant. However, in all cases, the error signal at both the transmitter and receiver must substantially agree. It is also understood that continuous variations or interval step variations of frequency, phase, and wave shape of error signals may be effected while maintaining these signals in substantial agreement, and such variations may be either automatic or manual. It is intended that the term "error signal" as used herein, may designate the phase modulating controlling signals of both the transmitter and receiver.

The normal horizontal synchronizing signals control the average frequency and average phase of horizontal scanning while a horizontal control will permit the application of particular correction signal to swing the scanning oscillator to plus and minus values from these averages.

It may be here observed that many receivers depart from proper adjustment so that their actual scanning is non-linear. The application of the present invention to such sets which deviate from linearity will not be affected other than by the usual results of such non-linearity.

Figure 10:
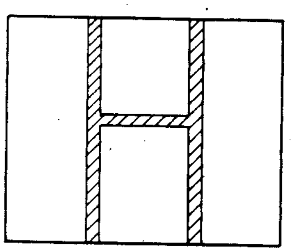
Fig. 10 is a view of an object as scanned at the transmitter end.
Figure 11:
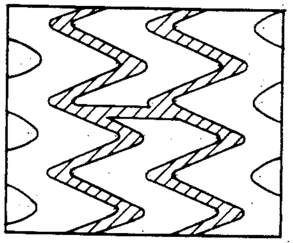
Fig. 11 is a representation of the object of Fig. 10 as received by a normal television receiver.

A conventional receiver picking up the transmission will receive a highly distorted picture as hereinabove described. Such sets will lock solidly on the synchronizing signals so that they will receive a picture representation, but such representation will be substantially useless and probably annoying to the viewer. Since the timing of the horizontal synchronizing pulses of each field is continuously varied by the phase modulation thereof, every straight vertical line in each field reproduced by the receiver is distorted badly into a sine wave or other predetermined pattern which further may drift slowly. Fig. 10 illustrates an object upon which the television camera may be focused at the transmitter end. Fig. 11 discloses a picture representation thereof which will be received by a standard, normal television receiver. The representation of Fig. 11 is that which results when an error signal of 180 C. P. S. is used. If the error signal is 181.5 C. P. S., the scallop patterns will further drift vertically.

Figure 12:
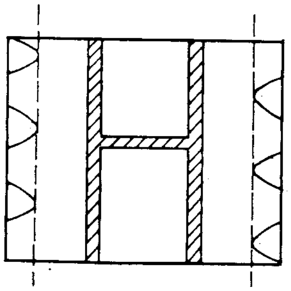
Fig. 12 is a picture of the object of Fig. 10 as received on a television receiver equipped according to the instant invention.

Fig. 12 illustrates a corrected picture as received on a properly equipped or authorized receiver. It will be observed that the transmitted picture is properly reproduced. A narrow band should be masked off on the receiver tube on each side of the screen so that the scallopped pattern will not be evident. The viewing area lost by doing so may be minimized by decreasing the degree of phase modulation which is employed for the error or correction signal.

The system herein described may find application, for example, where it is desired to link a group of theaters for simultaneous showing of a television program from a central television transmitter and where the program transmitted is of such commercial value that it becomes desirable to restrict reception to authorized receivers in such authorized theaters. An application may further be found in any case where it is desirable to set up a commercial television service which operates on a subscriber basis rather than on advertising sponsorship basis.

It will be observed that the adaptation of a receiver for enabling it to receive these restricted programs does not incapacitate it for normal reception of public television broadcasts. The elements of the instant invention may be simply switched into the circuit when desired. However, the amplitude control potentiometer on the output of the correction signal generator may well serve as a switch particularly since it is such amplitude that determines the phase shift of the horizontal scanning signal.

What is claimed is:

1. In a television transmitting apparatus for transmitting a video signal comprising regularly recurring successive image fields: generating means producing vertical and horizontal scanning signals for controlling the scanning of each image field of the transmitted signal; cyclically and continuously operative error signal generating means producing an error signal of constant average frequency higher than the frequency of recurrence of the image fields and in predetermined fixed ratio with respect thereto; phase displacement means continuously operable throughout a predetermined range of phase displacement connected to one of the scanning signal generating means for varying the instantaneous phase of the scanning signal generated thereby within each image field; and circuit means connecting the error signal generating means to the phase displacement means, whereby the instantaneous phase of the scanning signal generated by the particular scanning signal generating means connected to the phase displacement means will be varied within each field to produce a distorted video signal in which every otherwise straight line appearing in the image in one of the directions of scannning will be distorted along its length.

2. In a television receiver for receiving a video signal comprising regularly recurring successive image fields and vertical and horizontal scanning signals for controlling the scanning of each image field of the received signal, said video signal being distorted by a varying phase shift introduced into one of the scanning signals, the magnitude of said phase shift being in accordance with an error signal of cyclical and continuous character and of constant average frequency higher than frequency of recurrence of the image fields and in predetermined fixed ratio with respect thereto: a picture tube having vertical and horizontal deflecting means for reproducing the successive image fields of the video signal; vertical and horizontal scanning signal generating means, means to control the vertical and horizontal scanning signals by the respective scanning signals of the video signal, means to connect said vertical and horizontal scanning signal generating means to the respective deflecting means; phase displacement means continuously operable throughout a predetermined range of phase displacement connected to the scanning signal generating means for the direction of scanning in which the phase shift distortion was introduced; continuously and cyclically operative corrective error signal generating means, means in said error signal generating means to produce an error signal having the same frequency and wave shape as the error signal by which the video signal was distorted and in constant adjustably fixed magnitude and phase relationship with respect thereto; and circuit means connecting the error signal generating means to the phase displacement means, whereby the distortion introduced in the video signal will be corrected to produce an undistorted image on the picture tube.

3. A television receiver according to claim 2 and means to connect the error signal generating means to one of the scanning signal generating means.

4. A television receiver according to claim 2 and including means to form the error signal into a wave shape of sinusoidal form and alternating current character.

5. A television receiver according to claim 2 in which the corrective error signal generating means comprises a source of alternating current of a frequency in predetermined fixed ratio with respect to the frequency of recurrence of the image fields, a synchronous motor energized by the alternating current source; and a tone generator driven by the synchronous motor, and means to derive the corrective error signal from the tone generator.

6. A television receiver according to claim 5 further comprising a plurality of intermeshing gears interposed between the synchronous motor and the tone generator, means to drive said tone generator through said gears, at least one of said gears being shaped to provide a gear ratio which varies in the course of one revolution thereof.

7. A television receiver according to claim 2 in which the corrective error signal generating means comprises an oscillator, means to control the frequency of said oscillator by varying the magnitude of a control potential applied thereto; a cascaded series of divider stages, means to drive said divider stages by the oscillator for producing a reduced frequency equal to the frequency of one of the scanning frequency generating means; phase detection means connected to said scanning frequency generating means and to said divider stages to produce a control potential, means to apply said control potential to said oscillator to control the frequency thereof; and a further cascaded series of divider stages driven by said oscillator, and means to derive the error signal from the last-named series of divider stages.

8. A television receiver according to claim 7 in which the error signal has a wave shape of sinusoidal form and of alternating current character.

9. A television receiver according to claim 2 in which the phase displacement means is included in the horizontal scanning signal generating means, said phase displacement means comprising frequency control means responsive to a control potential for regulating the phase and frequency of the horizontal scanning signal, and means connecting the corrective error signal generating means to the frequency control means.

10. A television receiver according to claim 9 in which the frequency control means comprises a phase detector, means in said phase detector to produce a unidirectional control potential at the output thereof, said horizontal scanning signal generator means comprising a saw tooth generator, means to control the frequency and phase of said saw tooth generator by the control potential, and means to connect the output of the corrective error signal generator to said phase detector to modify the effective instantaneous magnitude of the control potential.

11. In a television apparatus including scanning means for producing successive fields and means to provide horizontal and vertical synchronizing signals for controlling said scanning means, a generator of an error signal, means to convert one of said synchronizing signals into a synchronizing signal cyclically and variably displaced in phase throughout each field, said displacement being controlled by said error signal and means to apply said phase displaced synchronizing signal together with the other synchronizing signal to said scanning means.

12. A television transmitting apparatus according to claim 1 in which the error signal generator comprises: a source of alternating current, means for controlling the frequency of said source of alternating current by one of the scanning signal generating means; a synchronous motor, means to energize said motor by the alternating current source; a tone generator driven by the synchronous motor, and means to derive the error signal from the tone generator.

13. A television transmitting apparatus according to claim 1 in which the error signal generating means comprises an oscillator, a cascaded series of divider stages, means to drive said divider stages by the oscilltaor for producing a reduced frequency equal to the frequency of one of the scanning frequency generating means; phase detection and control signal generating means connected to said scanning frequency generating means and to said divider stages to produce a control signal, means to apply said control signal to said oscillator to control the frequency thereof; a further cascaded series of divider stages driven by said oscillator, and means to derive the error signal from the last-named series of divider stages.

14. A television transmitting apparatus according to claim 13 in which the error signal has a wave shape of sinusoidal form and of alternating current character.

15. A television apparatus including scanning means and generating means to provide horizontal and vertical scanning signals, an error signal generator, means to control said error signal generator by the vertical scanning signal generating means so as to produce an error signal having a constant average frequency in predetermined fixed ratio with respect to the frequency of said vertical scanning signal, said error signal generator comprising an electronic oscillator and a first series of divider stages connected thereto, a second series of divider stages connected to said oscillator for producing a 60 C. P. S. output frequency, a phase detector, means for applying both said 60 C. P. S. output and the vertical scanning signal frequency to said phase detector, means to produce a control voltage from said phase detector by comparing the respective phases of the said frequencies applied thereto, a low pass filter, means in said filter to remove alternating current components from said control voltage, means to apply said control voltage to said oscillator for controlling the frequency and phase of the error signal produced thereby, means to convert the horizontal scanning signal into a phase modulated horizontal scanning signal, means to control the phase of said horizontal scanning signal by said error signal, means to apply said phase modulated horizontal scanning signal together with the vertical scanning signal to said scanning means.

16. A television apparatus according to claim 15 and wherein said apparatus includes automatic frequency control means of the horizontal synchronizing signal, said control means having a second phase detector and filter therein, said means to convert said horizontal synchronizing signal comprising means to connect the error signal to said second phase detector filter for controlling the output thereof, a horizontal synchronizing signal relaxation oscillator, means to phase modulate said relaxation oscillator by said output of said second phase detector filter, to produce the converted horizontal synchronizing signal, and means to connect the output of said relaxation oscillator to said scanning means for controlling horizontal scanning therein.

17. A television apparatus including scanning means, means to provide horizontal and vertical synchronizing signals and further including an automatic frequency control circuit, a horizontal scanning oscillator, means to control the output of said scanning oscillator by said automatic frequency control circuit for producing a horizontal scanning signal, said circuit having a phase detector and filter therein, an error signal frequency generator and means for controlling said generator by the vertical synchronizing signal to provide an error signal of a frequency related to the frequency of said vertical synchronizing signal, means to control the horizontal scanning oscillator by said error signal to produce a phase modulated horizontal scanning signal, said control means for phase modulating said horizontal scanning oscillator comprising means to connect the error signal generator to said phase detector filter so as to phase modulate the output of said oscillator by said error signal, and means to connect said oscillator to said scanning means for controlling horizontal scanning therein.

18. A television apparatus according to claim 17 and means in said error signal generator for providing an error signal frequency which is an integral multiple plus a fraction of the vertical synchronizing signal frequency.

19. A method of reception control in television systems which comprises generating and transmitting primary horizontal and vertical synchronizing signals for controlling the reproduction of successive fields in a television receiver, phase modulating a secondary synchronizing signal which is of the same frequency as one of said primary synchronizing signals by continuously and uniformly varying the phase thereof during control periods for individual fields while maintaining the same frequency, scanning an object employing said phase modulated secondary synchronizing signal and the other of said primary synchronizing signals for producing a video signal and transmitting said video signal on a carrier together with said primary synchronizing signals.

20. A method of reception control in television systems which comprises generating and transmitting primary horizontal and vertical synchronizing signals, phase modulating a secondary horizontal synchronizing signal which is of substantially the same frequency and wave shape as said primary horizontal synchronizing signal, by a signal derived from, so as to be controlled by, said vertical synchronizing signal, scanning an object under the control of said phase modulated secondary horizontal synchronizing signal for producing a video signal and transmitting said video signal together with said primary horizontal and vertical synchronizing signals for reception by a television receiver.

21. A method of reception control in television systems which include scanning means and provision of primary horizontal and vertical synchronizing signals, said method comprising generating an error signal of a frequency controlled by one of said synchronizing signals, providing a secondary, converted synchronizing signal which is continuously and uniformly phase modulated by said error signal and applying said converted synchronizing signal together with one of said primary synchronizing signals to said scanning means.

22. In a television apparatus including scanning means for producing successive fields and means to provide horizontal and vertical synchronizing signals for controlling said scanning means, means to generate a uniform, continuous error signal of alternating current form, the frequency of said error signal being a multiple plus a fraction of the frequency of said vertical synchronizing signal, means to phase modulate said horizontal synchronizing signal by said error signal so as to maintain the average frequency of the unmodulated horizontal synchronizing signal while cyclically and continuously varying its phase relative to the unmodulated horizontal synchronizing signal throughout each field, and means to apply said vertical synchronizing signal and said modulated horizontal synchronizing signal to said scanning means for controlling it.

23. A television transmitting apparatus according to claim 1 in which the error signal has a wave shape of sinusoidal form and of alternating current character.

24. A television transmitting apparatus according to claim 12 further comprising a plurality of intermeshing gears interposed between the synchronous motor and the tone generator, said tone generator being driven through said gears, at least one of said gears being shaped to provide a gear ratio which varies in the course of one revolution thereof.

References Cited in the file of this patent

UNITED STATES PATENTS

| Number | Name | Date |
|---|---|---|
| 2,231,829 | Lewis | Feb. 11, 1941 |
| 2,237,640 | Urtel | Apr. 8, 1941 |
| 2,251,525 | Rosenthal | Aug. 5, 1941 |
| 2,254,435 | Loughren | Sept. 2, 1941 |
| 2,277,000 | Bingley | Mar. 17, 1942 |
| 2,293,233 | Wheeler | Aug. 18, 1942 |
| 2,298,863 | Bartelink | Oct. 13, 1942 |
| 2,402,067 | Mathes | June 11, 1946 |
| 2,403,059 | Dillenback et al. | July 2, 1946 |
| 2,405,252 | Goldsmith | Aug. 6, 1946 |
| 2,414,101 | Hogan | Jan. 14, 1947 |
| 2,435,736 | Carnahan | Feb. 10, 1948 |
| 2,472,774 | Mayle | June 7, 1949 |
| 2,510,046 | Ellet | May 30, 1950 |
| 2,547,598 | Roschke | Apr. 3, 1951 |
| 2,566,764 | Fyler et al. | Sept. 4, 1951 |

OTHER REFERENCES

Phonevision by Roschke, November 1, 1948, pages 5 to 11; Figs. 2 to 5.